Aug. 14, 1928.
R. H. WAPPLER
ENDOSCOPE
Filed June 25, 1923
1,680,490
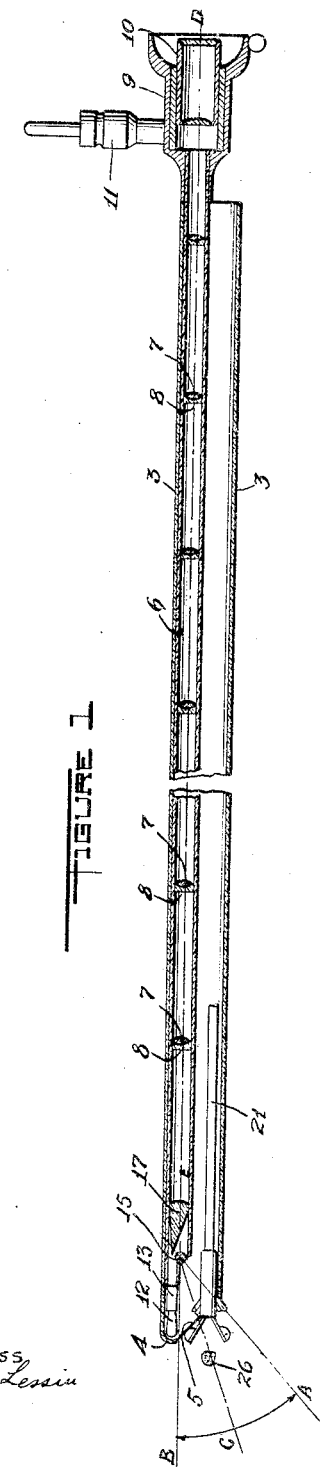
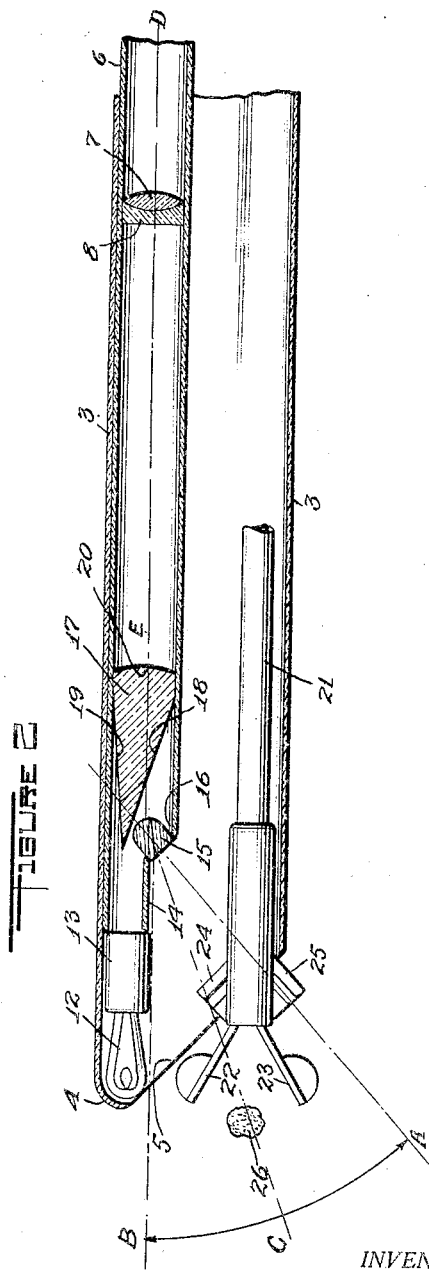
INVENTOR:
REINHOLD H. WAPPLER
BY Walton Harrison,
HIS ATTORNEY.

Patented Aug. 14, 1928.

1,680,490

UNITED STATES PATENT OFFICE.

REINHOLD H. WAPPLER, OF YONKERS, NEW YORK.

ENDOSCOPE.

Application filed June 25, 1923. Serial No. 647,439.

My invention relates to endoscopes of the type in which an optical tube, known in this art as a telescope, is used for insertion into the various passages, tubes, cavities and wall enclosures of the human body, and employed either alone, for purposes of observation, or in connection with an operating instrument for performing surgical operations or the like.

More particularly stated I seek to produce a telescope having a function as a periscope and carrying a lamp and having an optical system so arranged that the field of vision, from the objective end of the telescope, is in the form of a cone the axis of which diverges from the optical axis of the telescope; so that to an observer looking through the telescope the field of vision appears like a circular disk, the periphery of this disk, at the point thereof nearest the axis of the telescope, being approximately in alinement with a line extending as a continuation of the optical axis of the telescope. In other words the observer, by looking through the conical field of vision but along a line in the closest possible proximity to the periphery of the field and yet as close as possible to the optical axis of the telescope, can see in a direction parallel to the optical axis of the telescope and so close to said axis as to practically coincide therewith.

In my improved endoscope I use a straight optical tube, cut off obliquely at its objective end and thus provided with an opening which is substantially elliptical. Within the distal end of the telescope and adjacent the opening just mentioned I place optical mechanism through which the observer can see, and so arranged that one edge of the cone of vision extends in a straight line coinciding practically with the optical axis of the telescope, the opposite edge of the cone of vision reaching over to the edge of the opening most remote from the said line.

Within the distal end of the optical tube, in a straight line with the optical system, and in close proximity to the optical axis of the telescope, is an incandescent lamp which illuminates the field of vision but which takes up no additional space outside of that occupied by the optical system.

My improved endoscope presents a number of distinct advantages over the endoscopes of the prior art. It enables the operator to see all parts of a field of vision reaching from a point practically straight ahead of the telescope and substantially in alinement with the optical axis thereof to another point displaced about fifty degrees from the said optical axis.

Such being the case my improved telescope can be used in relations heretofore unknown for devices of this kind. It can be employed, for instance, along with an operating instrument which is strictly rectilinear, and which is inflexible in the sense that it can not be bent upon an axial line, and yet so that the operator looking through the telescope can see plainly what the instrument is doing.

Many kinds of endoscopes carrying operating instruments or closely associated therewith in structure, have heretofore been used. In some instances the endoscope is provided with a straight telescope and with a straight passage through which is passed a surgical instrument which is lengthy and straight. The trouble with an endoscope of this kind is, that although the operator can see through the straight telescope, he can see in no direction except straight ahead of the telescope, and even there his field of vision is necessarily small. Hence under ordinary conditions it is a difficult matter for him to see just what the operating instrument is doing. In other instances the telescope is bent or its optical axis is deflected, usually at a right angle to the main or primary axis of the instrument, and when this is the case the operating instrument, in order to be extended through or housed within the endoscope, must be pliable or capable of bending from a predetermined axial line. Moreover, the endoscopes of the kinds just mentioned are not in all instances well adapted to exhibit properly the work done by the operating instrument. Either the image may be distorted, or the view is taken from a direction unfavorable for accurate observation, and apt to be misleading. All such endoscopes are rather difficult to manipulate so as to bring the telescope to bear upon the particular object being observed, such for instance as a lesion, and then to bring the operating instrument into suitable position relatively to the lesion. They are as a rule useful in certain cases but not in others.

Further, in endoscopes of various kinds used in connection with operating instruments, the difficulties above mentioned and others of their kind are rendered worse if, as frequently happens, the optical arrangement of the telescope is such as to cause confusion in direction, as by making the right side of an object appear as its left side, or vice versa.

I seek to remedy all of the troubles above mentioned and others of their kind by my device, used in the manner hereinafter described.

Reference is made to the accompanying drawing forming a part of my specification, and in which like reference characters indicate like parts throughout the several figures.

Figure 1 is a substantially central longitudinal section through my improved endoscope, the operating instrument being partly broken away.

Figure 2 is a fragmentary section similar to a portion of Figure 1, but upon a larger scale.

A sheath 3, having a general tubular form, is provided with a nose tip 4, curved as shown. The sheath is further provided with an opening 5, having such form as would result from cutting the sheath off obliquely.

Housed within the sheath 3 is a telescope 6, having generally the form of a rather lengthy tube of small diameter and carrying a number of lenses 7 and 8, arranged in pairs. The telescope tube is provided with an enlarged end portion or head 9, provided with a lens mounting 10. The head 9 carries electrical connections 11, used with a miniature electric lamp 12, which extends into the nose tip of the sheath, and is supported upon a mounting 13 which is carried by a cylindrical portion 14 of the telescope 6, this portion having a diameter smaller than the main body portion of the telescope.

The telescope tube carries also a lens 15, and is provided with an opening 16 which encircles the lens and serves as a setting for holding the same in position. The lens 15 is a plano-convex lens with cylindrical prolongation, its plane side facing outward in a direction oblique to the axis of the telescope tube. The telescope is also provided with a prismoid 17, having a pair of oppositely disposed faces 18 and 19 meeting each other at an acute angle. The prismoid is also provided with a convex face 20.

An operating instrument is shown at 21, and in this instance is a straight pair of forceps, provided with jaws 22 and 23, and guides 24 and 25. The instrument is quite lengthy, and not adapted to be bent. An object 26 is shown as in position to be grasped by the jaws 22 and 23. This may be considered as a bladder stone, or an object lodged in a bronchial tube.

The structure and action of the forceps, considered apart from the other elements shown and described, are old and well known.

The miniature lamp 12, extends straight out into the nose tip 4, which is curved around it. The nose tip has a concave surface disposed adjacent the lamp, and thus acts as a reflector therefor. The general longitudinal axis of the lamp is parallel with, and displaced but a trifling distance from, the general optical axis of the telescope. Thus the lamp 12 is in close proximity to the opening 5.

I find it desirable to so proportion the lens 15 and the prismoid 17 as to deflect the central line of vision about twenty four degrees. This much deflection, with an angle of divergence of twenty four degrees on each side of the central line, gives a field of vision of above forty five degrees, extending from a line A to a line B, and the axis of which is indicated by a line C, the optical axis of the telescope being indicated by the line D—E. The two faces 18 and 19 of the prismoid 17 meet at an angle of 24 degrees, but this angle may be varied within reasonable limits, so as to obtain the deflection just mentioned, which is generally around forty five degrees and is always considerably less than ninety degrees. I find it practicable to give the lens 15 and the prismoid 17 the proportions essential for the purpose mentioned. I also find that with the parts thus arranged, the lamp 12 can be maintained almost but not quite in axial alinement with the telescope, and yet completely outside of the field of vision. By this arrangement the operator can see practically straight ahead of the telescope, and can also see an object such as 26 almost as clearly as he could if it faced him directly and was visible directly along a straight line. Further, the operator can see the jaws 22 and 23 and the object 26 all in their normal relations as to relative position. By turning the instrument 21 upon its own longitudinal axis and manipulating the jaws 22 and 23, the operator can close the jaws upon the object 26, and in so doing can all the while see the jaws and the object.

One very great advantage of this endoscope is that the observations made by the operator while using the device give him correct ideas as to proportions, relative distances and the like. For instance if the endoscope as a unit extends into a cavity of the body and is then grasped and moved gently endwise a little further in, the operator, looking through the telescope, sees from the changed relative positions of such parts of the body as come within the field of vision, just what he would see if he were looking at the same parts directly, through a conical tube. If he causes the jaws of the forceps to move toward each other, he can see with a fair degree of accuracy what he is doing.

In parts of the body such as the bladder, the nasopharynx and the sinuses, where the tissues may have undergone pathological changes, it is highly essential that the operator, in order to observe the tissues, shall not only be able to see them, but to see them substantially as they would appear if he looked at them rather directly. It is impracticable for the operator to do this if he has to look at them through optical instruments of the sort heretofore used, in connection with operating instruments of the kind here contemplated.

In practically all of the endoscopes heretofore used and in which both the telescope and the operating instrument were straight, it has been almost impossible for the operator to estimate distances directly ahead of the telescope. With my device, distances are in fact what they appear to be.

I do not limit myself to the precise mechanism shown and described, as variations may be made therefrom without departing from my invention, the scope of which is commensurate with my claims.

I claim:

1. An endoscope comprising an optical tube and an optical system located within said tube and including a lens, said optical system being so arranged that the optical axis of the tube extends through the lens and through a field of vision in the form of a disk, this disk being so positioned that its axis crosses the optical axis of the tube and extends through said lens, said disk at one point along its periphery extending approximately to a line drawn straight as a prolongation of the optical axis of the tube.

2. An endoscope, comprising a tube and an optical system mounted therein, said optical system being provided with means for deflecting the optical axis approximately twenty five degrees, and an electric lamp carried by said tube and mounted upon the distal end thereof and in alinement with a portion of said optical system.

3. An endoscope comprising a straight sheath of substantially tubular form provided at one of its ends with a nose tip, a telescope extending into said sheath, said telescope being straight from one of its ends to the other and reaching throughout practically the length of said sheath and into said nose tip, and a miniature lamp carried by said telescope and extending into said nose tip.

4. An endoscope comprising a sheath of substantially tubular form, an operating instrument of slender form for the purpose of being thrust through said sheath, and a telescope mounted within said sheath, said telescope carrying a lamp and being provided with an opening disposed adjacent said lamp, and further provided with a prismoid and a lens, said prismoid and said lens being so formed and arranged as to bend the optical axis of the telescope through said opening and bring said optical instrument into view.

5. An endoscope comprising a sheath of substantially tubular form, an operating instrument to be thrust through said sheath, said operating instrument being provided with movable operating members, and a straight telescope extending into said sheath, said telescope having an opening and also having an optical axis extending through said opening and bent toward said movable operating member for the purpose of enabling the operator to look through the telescope at said movable operating members.

6. An endoscope comprising a sheath having a general tubular form and provided with a passage extending therethrough from end to end, a surgical instrument for extending through said passage and provided with an operating portion for protruding from the distal end of said sheath, and a telescope extending through said sheath and into proximity to the protruding portion of said surgical instrument, the optical axis of said telescope being straight except at the distal end thereof, in immediate proximity to said operating portion of said surgical instrument, and there bent so as to bring said operating portion of said surgical instrument into view.

7. An endoscope comprising a sheath having a general tubular form and provided with a straight passage extending through said sheath from end to end thereof, an operating instrument having considerable length and a slender form in order to be thrust entirely through said passage so as to protrude slightly from the distal end of said sheath, and a telescope extending through said passage and provided at its distal end with an opening and with a prismoid and a lens disposed adjacent said opening for the purpose of bending the optical axis of the telescope in the direction of the protruding portion of the operating instrument.

8. An endoscope comprising a sheath having a general tubular form and provided with a straight passage extending from end to end of the sheath, an operating instrument having a slender form and thus adapted to be thrust through said passage so as to protrude slightly from the distal end thereof, and a telescope extending into said passage for enabling the operator to look through said passage and see the protruding portion of said operating instrument, said telescope being straight from one of its ends to the other and having an optical axis which is straight except at the distal end thereof, in immediate proximity to the protruding portion of the operating instrument, and there bent in order to expose to view said protruding portion of the operating instrument.

9. An endoscope, comprising an optical tube carrying a lens and a prismoid, the prismoid having the proximate form of a wedge with its two long faces diverging from each other at an angle at approximately twenty four degrees.

10. An endoscope, comprising a telescope carrying an optical system provided with means for bending its optical axis far enough to bring one edge of the field of vision substantially into alinement with the axis of the telescope, said telescope also carrying at its distal end a lamp located adjacent the periphery of said field of vision.

11. An endoscope, comprising a telescope carrying an optical system provided with means for bending its optical axis far enough to bring one edge of the field of vision substantially into alinement with the axis of the telescope, said telescope also carrying at its distal end a lamp located adjacent the periphery of said field of vision, but in a direction therefrom contrary to the direction in which said optical axis is bent.

12. An endoscope, comprising a telescope carrying an optical system provided with means for bending its optical axis far enough to bring one edge of the field of vision substantially into alinement with the axis of the telescope, said telescope also carrying at its distal end a lamp located within the caliber of the outside diameter of the telescope and adjacent the periphery of said field of vision.

13. A telescope of the character described having at its end a lamp-accommodating extension of reduced cross-section but lying wholly within the space bounded by the extended peripheral surface of said end, and an objective in said end, said objective being constructed and arranged to render visible through the telescope a field of vision alongside of the extension and whose innermost limit lies within said space.

14. A telescope of the character described having at its end a lamp-accommodating extension of reduced cross-section but lying wholly within the space bounded by the extended peripheral surface of said end, and an objective in said end, said objective being constructed and arranged to render visible through the telescope a substantially conical field of vision whose apex lies adjacent to the uncovered portion of the objective and which extends obliquely forwardly from said apex in an offset manner which excludes the lamp therefrom.

15. An illuminating telescope device for the direct insertion into a body cavity for examination of the latter, said device comprising an unbent tubular element, a lamp associated with the end thereof in a manner which disposes the lamp wholly within the space bounded by the lateral surfaces of the tube, and an objective in said end and having an exposed portion thereof arranged to one side of the lamp, said objective being so constructed and arranged that its field of vision is obliquely forward of said exposed portion so as to exclude the space bounded by the lamp.

Signed at Long Island City, in the county of Queens and State of New York, this 26 day of May, 1923.

REINHOLD H. WAPPLER.